Aug. 13, 1946.  J. H. HAMMON  2,405,826
MULTIFOCAL OPHTHALMIC LENS BLANK
Filed Dec. 18, 1942  4 Sheets-Sheet 1

INVENTOR.
James H. Hammon.
BY
Cubett, Mohney & Miller
ATTORNEYS

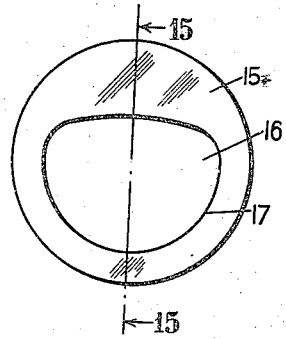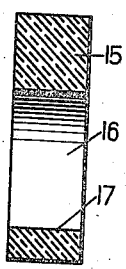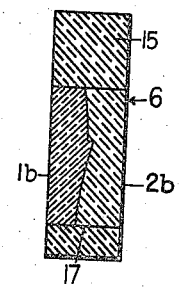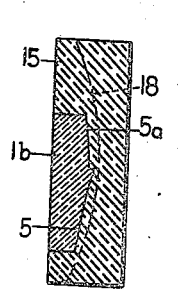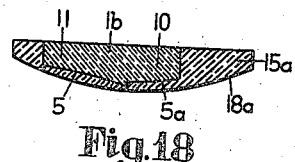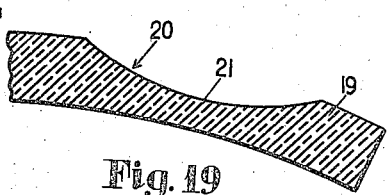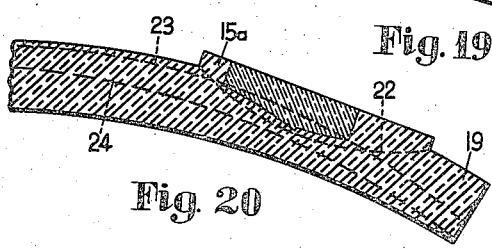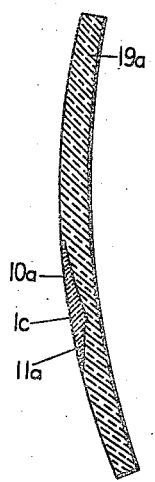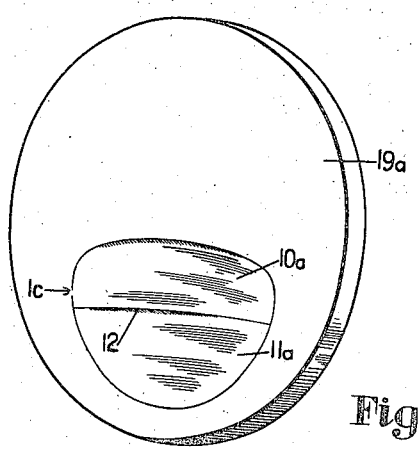

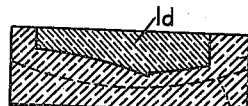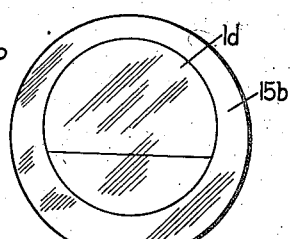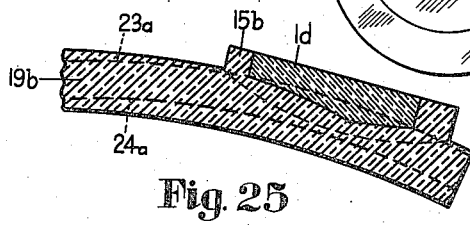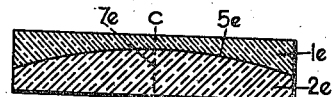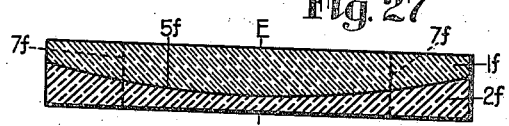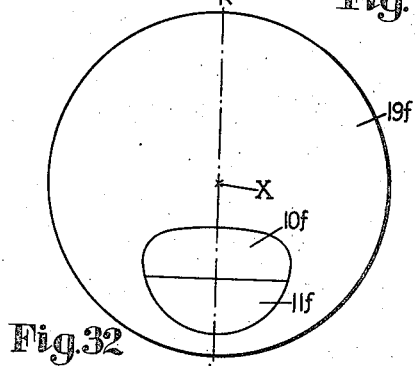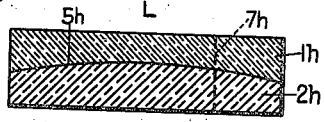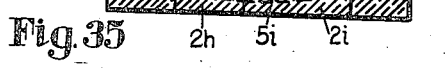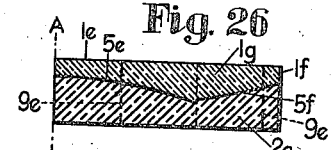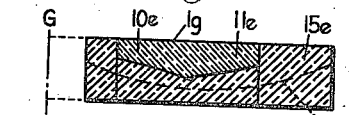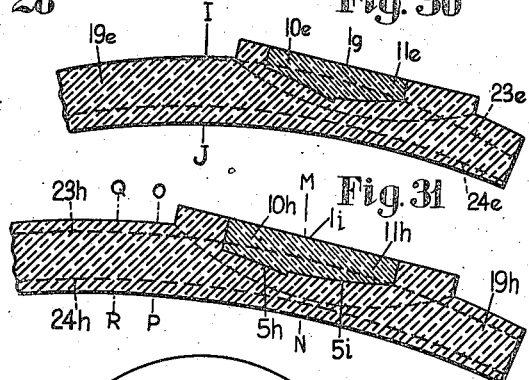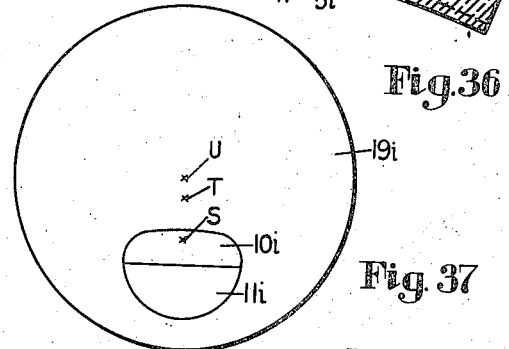

Patented Aug. 13, 1946

2,405,826

UNITED STATES PATENT OFFICE 2,405,826

MULTIFOCAL OPHTHALMIC LENS BLANK

James H. Hammon, Vincennes, Ind.

Application December 18, 1942, Serial No. 469,418

2 Claims. (Cl. 88—54)

My invention relates to multifocal ophthalmic lens blanks. It has to do, more particularly, with the provision of lens blanks which permit of the production of multifocal lenses of more than two fields of vision, such as trifocal lenses, completely adequate to the correction of defective vision.

This invention relates to improvements on the lens blank disclosed in my Patents No. 2,006,638, issued July 2, 1935; No. 2,029,479, issued February 4, 1936; No. 2,029,480, issued February 4, 1936; No. 2,065,132, issued December 22, 1936; No. 2,177,021, issued October 24, 1939; and No. 2,177,022, issued October 24, 1939. In said patents, I describe variations of lens blanks which can be finished into lenses having more than two fields of vision and which are completely adequate to the correction of defective vision. According to said patents, it is possible to produce a multifocal ophthalmic lens blank which can be finished into the final lens in such a manner that the optical centers of the minor segments can be selectively located as desired. According to said patents, one or more thick segments of glass of suitable refractive index is embedded in a carrier portion of glass of a different index of refraction. The composite button, thus formed, is then ground to a predetermined curvature on one side thereof to expose one surface of the segment or segments, the curvature depending upon the desired power of the segment in the finished lens to be formed by the thick segment of the composite button. A countersink surface is formed in a major blank of glass of the same index of refraction as the carrier portion of the composite button. The finished curved surface of the composite button is then fused to the countersink surface in the major blank. In the fusing operation, the carrier portion of glass becomes an indistinguishable part of the major blank. Thus, there is produced a multifocal ophthalmic lens blank consisting of a major blank having one or more thick segments embedded therein. By grinding the segment-carrying side of the blank, the optical centers of the segment or segments and the major blank may be selectively located. By grinding the opposite side of the blank to a prescribed curvature, a finished lens will be produced which will have the desired refractive powers in the minor and major portions of the lens.

To obtain various powers of minor portions in the finished lenses according to said patents, it is necessary to provide a series of composite buttons having predetermined curves which differ from each other. Consequently, it is necessary to provide a series of major blanks with countersink curves varying from each other in the same manner as the curves of the series of composite buttons which are to be fused thereto. The countersink curve of each major blank must be of an accurate predetermined curvature depending upon the particular powers it is desired to produce in the minor portions of the finished lens. Thus, since it is necessary to provide a series of major blanks with varying countersink curves which must be of accurate predetermined curvatures, the necessary grinding operation for producing a series of lens blanks of different powers is complicated. Furthermore, the composite buttons cannot be tested for accuracy and quality until they are fused to the major blanks, since some defect may result during the fusing operation. Thus, if any defects do occur during the fusing operation, the entire major blank, which carries the fused button, must be discarded.

One of the objects of my invention is to provide a multifocal ophthalmic lens blank of such a nature that it will be possible to provide a lens having more than two fields of vision with optical powers in the various fields that may be regulated at will.

Another object of my invention is to provide a multifocal ophthalmic lens blank of such a nature that it will be possible to produce a lens having more than two fields of vision wherein the optical centers of the minor fields may be selectively located relative to the optical center of the major field and wherein the optical centers of the minor fields may be selectively located relative to each other in a more effective manner than heretofore.

Another object of my invention is to provide a lens blank of the type indicated for producing a lens having more than two fields of vision wherein the dividing line between adjacent minor fields and between the minor fields and the major field may be of any selected outline.

Another object of my invention is to provide a multifocal ophthalmic lens blank of such a nature that it will not be necessary to provide a series of major blanks having optical surfaces of varying curvatures formed thereon for receiving a series of composite buttons having varying curvatures, in order to produce a series of lens blanks having segments of varying powers.

Another object of my invention is to provide a composite button for use in a multifocal lens blank of the type indicated which will have elements of glass, of all of the refractive indices used in making the complete lens blank, so associated in the composite button that there will be little danger of defects occurring in the lens blank during the fusing of the composite button to the major blank.

Another object of my invention is to provide a composite button of the type indicated in the preceding paragraph which may be tested for accuracy and quality before being fused to the major blank.

In its preferred form, my invention contemplates the forming of a multifocal ophthalmic lens blank by forming a composite button which includes a segment of one index of refraction and a carrier portion of another index of refraction. The segment is of substantial thickness throughout its entire area and is of an index suitable for forming the minor portions of the finished lens. The segment is so formed that it consists of a single piece of glass comprising two or more portions having different curves at the one side of the segment, the curves being selected to give the desired powers to the minor portions of the finished lens. The curves of the two portions can be so related that the optical centers of the two portions may be located as desired. The dividing line between the two portions may be of any selected contour. The carrier portion is of an index of refraction different from the segment portion but is of the same index of refraction as the major blank to which the composite button is to be fused. The segment is so embedded in the carrier portion that the segment is laterally surrounded by the carrier portion and that surface of the segment which has the portions of different curvature is completely covered by the carrier portion. Thus, the carrier portion will consist of glass of all the indices of refraction used in making the finished lens.

Since the finished surface of the segment, which is composed of areas of different curvatures, is completely covered by glass of the same index of refraction as the major blank to which the composite button is to be fused, the composite button can be fused to the major blank with little danger of any defects occurring at the contacting surfaces of the major blank and the composite button. Before the composite button is fused to the major lens blank an optical surface is formed on that side of the composite button opposite to the side in which the segment is embedded. A similar complemental optical surface is formed on the major lens blank. These complemental surfaces may be of any desired curvature or may be flat, since the nature thereof will have no bearing on the power of the segment. Thus, in producing a series of lens blanks of varying powers, it is not necessary to have a series of major blanks which have button-receiving optical surfaces of varying powers. The button-receiving surface on all of the major blanks can be of the same nature. Furthermore, the composite buttons may be tested for accuracy and quality before being fused to the major blank, since the curved surface of the segment will already be fused to glass of the same index of refraction as the major blank. Consequently, there will be no danger of defects occurring during the fusing of the composite button to the major blank. Since the composite button can be tested for accuracy and quality before being fused to the major blank, if a rejection is necessary, this will not entail the expense of fusing the button to the major blank and the consequent loss of the major blank along with the expense of resurfacing a new major blank.

When the composite button is fused to the major blank, the carrier portion will become an indistinguishable part of the major blank since it is of the same index of refraction. Thus, there will result a major blank having a thick segment embedded in one surface thereof, said thick segment having two or more portions at the embedded surface thereof which differ from each other in curvature. The segment-carrying surface of the blank may then be ground to the required curvature and in the desired manner to determine the power of the segment relative to the major blank and to selectively locate the optical centers of the minor portions, formed by the segment, relative to the optical center of the major blank. It is to be understood that the relative location of the optical center of the minor portion of the segment has been previously determined to a degree in forming the segment. To complete the final lens from the lens blank, the opposite surface of the blank is then ground to the prescribed curvature.

The preferred embodiment of my invention is illustrated in the accompanying drawings wherein similar characters of reference designate corresponding parts and wherein:

Figure 14 is a plan view of a carrier portion of glass for receiving the segment button.

Figure 15 is a sectional view taken substantially along line 15—15 of Figure 14.

Figure 16 is a similar view showing the segment button positioned therein.

Figure 17 is a view similar to Figure 16 showing the composite button after the segment button is fused in the carrier portion.

Figure 18 is a sectional view of the composite button after one side has been formed to the proper curvature.

Figure 19 is a sectional view illustrating the main blank having a countersink formed therein for receiving the composite button of Figure 18.

Figure 20 is a sectional view showing the composite button fused to the main blank.

Figure 21 is a sectional view of the finished lens blank, made from the blank of Figure 20.

Figure 22 is a perspective view of the finished lens blank.

Figure 23 is a sectional view taken through a composite button which includes a circular segment.

Figure 24 is a plan view of the button of Figure 23.

Figure 25 is a sectional view showing the button of Figure 23 fused to the main blank.

Figure 26 is a plan view of a finished lens blank made from the blank of Figure 25.

Figure 27 is a view similar to Figure 2 illustrating a fused laminated unit for use in forming a segment button.

Figure 28 is a similar view of another laminated unit having different curves from those of Figure 27.

Figure 29 illustrates a piece of the unit of Figure 27 edge-fused with a piece of the unit of Figure 28.

Figure 30 illustrates a composite button embodying part of the laminated unit of Figure 29.

Figure 31 is a sectional view showing the composite button of Figure 30 fused to a main blank.

Figure 32 is a plan view of a finished lens blank made from the lens blank of Figure 31.

Figure 33 is a view similar to Figure 27 but illustrating how a different section of the laminated unit can be used in forming the segment button.

Figure 34 is a view similar to Figure 28 illustrating how a different section of such laminated unit may be used in forming the segment button.

Figure 35 is a sectional view illustrating how the piece of glass cut from the unit of Figure 33 may be edge-fused to the piece of glass cut from the unit of Figure 34 and then be incorporated in a carrier portion.

Figure 36 is a sectional view illustrating a composite button, formed from the unit of Figure 35, fused to a main blank.

Figure 37 is a plan view of a finished lens blank made from the blank of Figure 36.

Figure 1:
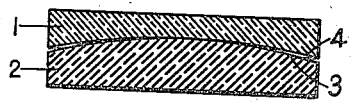
Figure 1 is a sectional view taken through two pieces of glass in superimposed relationship which are used for forming a segment button.

In forming a lens blank according to my invention, I first select a thick piece of flat glass 1 and thick piece of flat glass 2 which may be of substantially square or other suitable outline. The glass 2 is preferably of the same index of refraction as the main blank which will be referred to subsequently. For example, it may be crown glass. A convex surface 3 is formed on one side of the piece 2. This surface 3 will be an optical surface of a predetermined curvature which may be formed by grinding and polishing or in any other suitable manner. The curvature 3 will be accurately predetermined and will depend on the power desired in one of the minor portions of the finished lens.

Figure 5:
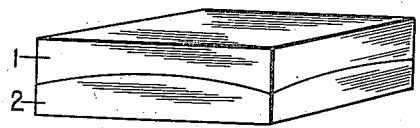
Figure 5 is a perspective view of the fused laminated unit of Figure 2.

The piece of glass 1 is of an index of refraction different from the piece of glass 2. This index is such that the glass will be suitable for forming a part of the segment portion of the lens. For example, it may be lead or flint glass. A concave surface 4 is formed on one side of the piece 1. This surface 4 will be an optical surface which may be formed by grinding and polishing or in any other suitable manner. The curvature of the surface 4 will be complemental or almost complemental but slightly different from that of the surface 3. The two pieces of glass 1 and 2 are disposed in superimposed relationship, in the manner indicated in Figure 1, and are then fused to form the unit illustrated in Figure 2. During the fusing, the glass 1 will be so held that it will soften first and will settle onto the glass 2, forcing the air outwardly, so that the surfaces 3 and 4 will fuse to each other, the curvature of the surface 3 being maintained. Thus, there will be produced a laminated unit (Figures 2 and 5) formed of the pieces 1 and 2 fused along a line 5 of predetermined curvature.

Figure 3:
Figure 3 is a view similar to Figure 1 and showing two pieces of glass having curves formed thereon which are the reverse of those in Figure 1.
Figure 6:
Figure 6 is a perspective view of the fused laminated unit of Figure 4.

I next select a thick piece of glass 1—a which is of high index and of the same outline as the piece 1 and a thick piece of glass 2—a which is of relatively low index and of the same outline as the piece 2. The pieces 1 and 1—a are of the same index of refraction and the pieces 2 and 2—a are of the same index of refraction. On one side of the piece 2—a I form a concave curve 3—a in a suitable manner. This curve 3—a will be formed accurately and will depend upon the desired power of another minor portion of the finished lens. On one side of the piece 1—a I form a convex surface 4—a which will be almost complemental but slightly different from that of the surface 3—a. The two pieces of glass 1—a and 2—a are disposed in superimposed relationship, in the manner indicated in Figure 3, and are then fused to form the unit illustrated in Figure 4. During the fusing, the glass 1—a will soften first and will settle onto the glass 2—a, forcing the air outwardly, so that the surfaces 3—a and 4—a will fuse to each other, the curvature of the surface 3 being maintained. Thus, there will be produced a laminated unit (Figures 4 and 6) formed of the pieces 1—a and 2—a fused along a line 5—a of predetermined curvature.

It will be noted that the optical centers of the pieces 1 and 2 will be at the geometrical centers thereof and will correspond with each other. Similarly, the optical centers of the pieces 1—a and 2—a will be at the geometrical centers of such pieces and will correspond with each other.

Figure 10:
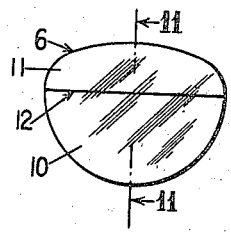
Figure 10 is a plan view of the segment button.
Figure 11:
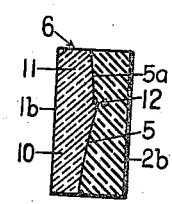
Figure 11 is a sectional view of the button taken substantially along line 11—11 of Figure 10.
Figure 12:
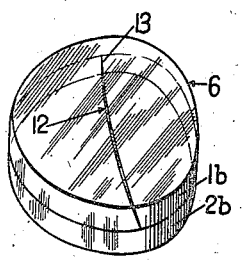
Figure 12 is a perspective view of the segment button.
Figure 13:
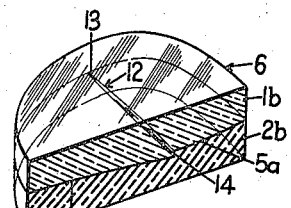
Figure 13 is a view, partly in section and partly in perspective, of the segment button.

The next step is to make the segment button 6 of Figure 10. This segment button will consist of a portion of the laminated unit of Figure 2 and a portion of the laminated unit of Figure 4 which will be edge-fused to each other. The laminated unit of Figure 2 may be split in half, or otherwise if curves are to be differently arranged, as indicated by the dotted line 7 in Figure 2. The laminated unit of Figure 4 may be cut along the dotted lines 7—a to remove a central section of the unit, or may be otherwise cut if curves are to be differently arranged. This central section may be discarded.

Figure 2:
Figure 2 is a similar view showing the two pieces fused together.
Figure 4:
Figure 4 is a similar view showing the two pieces of glass of Figure 3 fused together.
Figure 7:
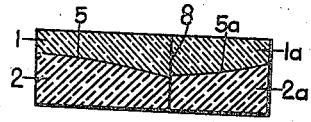
Figure 7 is a sectional view illustrating a piece of the unit of Figure 2 with its edge in contact with a piece of the unit of Figure 4.

One of the sections of the unit of Figure 2, for example, the one to the right, is then disposed in edge-to-edge contact with one of the outer sections, for example the one to the right, of the unit of Figure 4. This edge-to-edge relationship is illustrated in Figure 7. The contacting edges are first finished by grinding and polishing. Of course, it will be understood that the left-hand section cut from the unit of Figure 2 can be used similarly with the left-hand section cut from the unit of Figure 4. When the two sections illustrated in edge-to-edge contact in Figure 7, along the line 8, are fused together, the laminated unit of Figure 8 results. During the fusing operation, the pieces of glass 1 and 1—a join to form a single layer 1—b, since they are both of the same high index glass. The pieces of glass 2 and 2—a join to form a single layer 2—b since they are both of the same low index glass. The layer 1—b is adapted to form the segment portion of the lens blank, while the layer 2—b will serve as part of the carrier portion of the composite button, as will later appear. The layer 1—b will have an inner surface consisting of a portion of the convex curve 5 and a portion of the concave curve 5—a.

Figure 8:
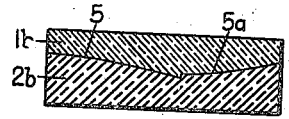
Figure 8 is a view of the pieces of glass of Figure 7 after they have been edge-fused together.
Figure 9:
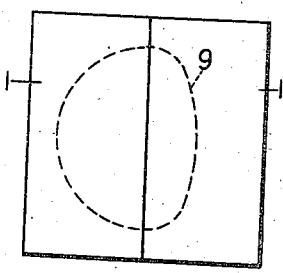
Figure 9 is a plan view of the unit of Figure 8 illustrating how a segment button may be cut therefrom.

The laminated unit of Figure 8 is then cut to the desired shape, for example, along the dotted line 9 of Figure 9 to form the segment button 6 shown in Figures 10 to 13. The button 6 may be of any desired shape depending upon the shape of segment it is desired to provide in the finished lens. I prefer the shape shown in Figure 10, comprising a substantially flat upper boundary line, a lower boundary line which is greater than a semicircle and joined to the flat upper line by curved arcs. As pointed out in my prior patents, this particular shape of segment has a number of advantages.

It will be noted that the layer 1—b is made of glass of a single index of refraction but will have portions 10 and 11 of different powers due to the different curves 5 and 5—a provided on the inner surface thereof. The portion 10 may serve as the intermediate portion of the final lens while the portion 11 may serve as the reading portion of the final lens. The differently curved portions 5 and 5—a are joined to each other along a boundary face 12. This face 12 may lie along a straight line, as indicated by the line in Figure 10, or may lie along an arcuate line. It will be noted from Figures 12 and 13 that since the surface 5 is of convex curvature and the surface 5—a is of concave curvature, the two portions 10 and 11 of different powers will not be in the same plane throughout the length of the boundary line. The surfaces 5 and 5—a may be at the same level at their juncture adjacent the outer ends of the boundary face 12 or other predetermined points, as indicated by numeral 13 in Figures 12 and 13, but will be at different levels throughout the remainder of the boundary face 12. Thus, there will be a shoulder 14 formed between the adjacent surfaces 5 and 5—a along the boundary face 12 except at its extreme outer ends.

The composite button of Figure 18 is next made. To do this, I select a suitable piece of flat glass of substantial thickness and of an index of refraction like that of the layer 2—b of the button 6 which is of the same index as the major blank to be referred to subsequently. From such glass I form a carrier portion 15 which is shown in Figure 14. A hole 16 is pressed or cut through or into the carrier portion 15. This hold is of the same shape as the button 6 and is preferably formed entirely within the carrier portion 15. It can extend partly through or entirely through the carrier portion, as shown in Figure 15, thereby being of substantial depth, so that a boundary wall 17 of substantial depth is formed.

The segment button 6 is then disposed in the carrier portion 15 in the manner indicated in Figure 16. The button 6 is then fused in the carrier portion 15 to form the unit shown in Figure 17. The edge of button 6 and the wall 17 may be polished surfaces or not as desired. As shown in Figure 17, during fusing the layer 2—b of button 6 will become an indistinguishable part of the carrier portion 15 since these two portions are of the same index of refraction. The layer 1—b will form a segment portion which will be of substantial thickness throughout its entire area and will be completely embedded within the carrier portion 15. The fused unit of Figure 17 is then subjected to a surfacing operation, such as grinding and polishing, to remove part of the carrier portion and to form a finished surface along the dotted line 18 of Figure 17.

In this manner, the composite button shown in Figure 18 will be produced. It will consist merely of the segment button 1—b and the carrier portion 15—a which will be of different indices of refraction. The segment button 1—b will be of substantial thickness throughout its entire area and will have its thick edge buried in the carrier portion 15—a which will be formed by the layer 2—b and carrier portion 15. Furthermore, the segment button 1—b will preferably be entirely laterally surrounded by the carrier portion 15—a. The segment button 1—b will have inner surfaces 5 and 5—a of different curvatures. These curvatures will be such that they will cooperate with the curvature to be produced on the outer surface of the complete lens blank to give the desired powers to the portions 10 and 11 of the segment 1—b. The curved surfaces 5 and 5—a will be completely covered by portions of the carrier portion 15—a.

The finished surface 18—a on the composite button may be of any desired curvature regardless of the strength desired for the two portions of the segment 1—b to be incorporated in the lens. A main blank is then selected which will be of the same index of refraction as the carrier portion 15—a. This blank 19 will preferably be of concavo-convex form. It may be of circular or other outline but is shown as circular in Figure 22. The countersink 20 is then formed in the convex surface of the blank 19 in any selected location relative to the optical center of the major blank 19. The bottom surface 21 of this countersink 20 is an optically finished surface which may be formed by a suitable method such as grinding and polishing. This curvature 21 will be complemental to the curvature of the surface 18—a of the composite button. The composite button is then positioned in the countersink 20 with the surface 18—a of the button in contact with the surface 21 of the countersink throughout its entire area. It is important that these surfaces 18—a and 21 be exactly complemental to each other so that no distortion of the surfaces 5 and 5—a of segment 1—b will occur during the fusing of the composite button to the major blank. With the composite button positioned in the countersink, the entire assembled unit is then subjected to a fusing operation. This fusing operation will cause the carrier portion 15—a of the composite button to fuse to the major blank 19, along the dotted line 22 in Figure 20, and become a part of the major blank since it is of the same index of refraction. To form a finished blank from this fused blank, it is merely necessary to grind and polish the segment-carrying convex surface to a predetermined convex curvature, such as along the dotted line 23 and the concave surface to a predetermined concave curvature such as along the dotted line 24. The resulting finished lens blank shown in Figures 21 and 22 will consist of a main portion 19—a having a segment portion 1—c embedded therein and which will consist of an intermediate vision portion 10—a and a reading portion 11—a.

It will be apparent that the composite button shown in Figure 18 will consist of glass of the two indices of refraction used in making the complete lens blank. The segment button 1—b will already be fused along the surfaces 5 and 5—a to glass of the same index of refraction as the major blank 19. The curvatures 5 and 5—a of the segment will be predetermined fixed curvatures and will not be changed during fusing to the main blank. Furthermore, there will be practically no danger of defects occurring at the contacting surfaces 18—a and 21 of the composite button and main blank, during the fusing operation since these surfaces are formed on the carrier portion 15—a and the major blank 19, respectively, which are of the same index of refraction. Consequently, the composite button shown in Figure 18 may be tested for strength and quality before being fused to the major blank 19. If any defects are present, the composite button is discarded before being fused to the major blank.

Another important advantage of my invention is that it is not necessary to provide a series of major blanks 19 having countersinks formed therein of varying curvature in order to provide a series of blanks having segments of varying powers. The countersink surface 21 in all the major lens blanks may be the same and will correspond to the curvature of the surface 18—a which is the same on all of the composite buttons. The various strength segments are provided in a series of composite buttons by variations in the curvatures of the surfaces 5 and 50—a. The surfaces 18—a and 21 have no bearing on the power of the segment incorporated in the lens except that they must be complemental to prevent distortion of segment 1—b during the fusing operation.

As will be described more in detail hereinafter, the relative location of the optical centers of the portions 10—a and 11—a of the segment 1—c will be determined to a great extent by the manner in which the sections are cut from the laminated unit of Figure 2 and the laminated unit of Figure 4 and the manner in which such sections are associated with each other to form the segment button. The relationship of the optical centers of the portions 10—a and 11—a to the optical center of the portion 19—a of the finished lens blank will depend upon the position and manner in which the composite button of Figure 18 is mounted on the major blank 19 and the manner in which the two surfaces of the lens blank are ground after the composite button is fused thereto. The different results which can be obtained by variation in the location of the countersink, which receives the composite button, and in the grinding operations for the front and back surfaces of the fused lens blank are set forth more in detail in my co-pending application, Serial No. 469,417, filed December 18, 1942, which issued as Patent No. 2,388,687 on November 17, 1945.

According to my invention, it should be understood that instead of edge-fusing the sections of glass shown in Figure 7 they could be cut to the proper outline and placed separately in the carrier portion 15, after which the fusing operation could take place. Also, instead of mounting the segment in the carrier portion, which is substantially equivalent to the disclosure of Figures 28 to 38 of my said co-pending application, I may follow the disclosure of Figures 1 to 18 of said co-pending application.

In Figure 23 I illustrate a circular segment 1—d embedded in a carrier portion 15—b. The segment 1—d may be formed in exactly the same manner as the segment 1—b and be mounted in the carrier portion in the same manner. This illustrates that my invention is not limited to any particular shape segment although the shape illustrated in Figure 23, as previously described, has a number of advantages. However, any shape segment may be provided. The composite button formed from the unit of Figure 23 by finishing along the line 18—b is mounted in a countersink formed in the major blank 19—b in the manner previously described. After the blank is fused, the opposite surfaces of the fused blank may be properly finished along curved lines 23—a and 24—a to form the finished lens blank shown in Figure 26. The curve 23—a may be so arranged that a shoulder or prism base may be located at any point around the periphery thereof or, if desired, the finishing operation may be carried on to such an extent that a feather edge is provided entirely around the periphery of the segment 1—d.

Figures 27 to 45 illustrate how different arrangements of optical centers may be obtained according to my invention.

In Figures 27 to 32 I illustrate how it is possible to produce a monocentric lens according to my invention. I produce a fused laminated unit consisting of layers 1—e and 2—e similar to the unit of Figure 2. These layers are joined along a curved line 5—e. Also, I produce a laminated unit, as shown in Figure 28, consisting of layers 1—f and 2—f fused together along a curved line 5—f and being similar to that of Figure 4. The unit of Figure 27 is cut along the line 7—e. The unit of Figure 28 is cut along the lines 7—f. As shown in Figure 29, a piece of the unit of Figure 28, the right-hand piece, is fused to a piece of the unit of Figure 27, the left-hand piece. Thus, there will be produced a laminated unit consisting of layer 1—g and layer 2—g. The layer 1—g will consist of parts of the layers 1—e and 1—f. The optical center of the curve of Figure 29 will be at the left-hand edge of the unit of Figure 29 along line A—B. This is due to the fact that the optical center of the curve 5—e in Figure 27 was along the line C—D corresponding to line 7—e where the unit was cut. The optical center of the curve 5—f of Figure 29 will also line along the line A—B due to the fact that the optical center of the curve 5—f in Figure 28 lies along the line E—F which is in alignment with the line C—D of Figure 27. Thus, the optical centers of portions 1—e and 1—f of Figure 29 will coincide and will be on line A—B.

A segment button is then cut from the unit of Figure 29 along the line 9—e. It is mounted in a carrier portion 15—e as shown in Figure 30. The optical centers of portions 10—e and 11—e of the segment 1—g disposed in the carrier portion 15—e will lie outside of the carrier portion along line G—H which is in alignment with the line A—B. The unit of Figure 30 is fused and is finished along the curve line 18—e. It is then fused in a countersink formed in a main blank 19—e. The optical centers of portions 10—e and 11—e of the fused blank will lie on the line I—J which is in alignment with the line G—H of Figure 30. The fused lens blank is then finished along the curved lines 23—e and 24—e in such a manner that the optical center of the major blank 19—e will also be located on the line I—J.

The finished lens blank shown in Figure 32 will have a reading portion 11—f, an intermediate portion 10—f, and a distance portion 19—f. All of the optical centers of the portions 11—f, 10—f and 19—f will coincide and will be at the point X which will be along a line K—L which is in alignment with the line E—F of Figure 28. The point X will, in this instance, coincide with the geometrical center of the portion 19—f. Thus, it is possible to produce a monocentric lens.

In Figures 33 to 37, inclusive, I have illustrated another arrangement of optical centers which may be obtained according to my invention. A laminated unit shown in Figure 33 like the unit of Figure 27 is provided. This unit consists of layers 1—h and 2—h fused together along a curved line 5—h. A second laminated unit similar to the unit of Figure 28 is provided as shown in Figure 34. This unit consists of layers 1—i and 2—i fused together along a curved line 5—i. The unit of Figure 33 is cut along the line 7—h and the unit of Figure 34 is cut along the line 7—i and sections of the two units are combined in the manner indicated in Figure 35 in a carrier portion 15—h. The composite button formed on the unit of Figure 35 is then fused to a main blank 19—h as shown in Figure 36. The fused blank will have an embedded segment 1—i consisting of portions 10—h and 11—h. The optical center of the portion 11—h will be along the line M—N, the optical center of the portion 10—h will be along the line O—P and the optical center of the portion 19—h will be along the line Q—R. The finished lens blank will be formed from the fused lens blank of Figure 36 by finishing the fused blank along the curved lines 23—h and 24—h. Thus, the fused lens blank shown in Figure 37 will consist of a reading portion 11—i having its optical center at the point S, an intermediate vision portion 10—i having its optical center at the point T, and a distance vision portion 19—i having its optical center at the point U.

Figure 38:
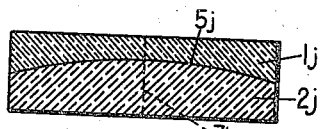
Figure 38 is a sectional view of a laminated unit similar to that of Figure 2.
Figure 39:
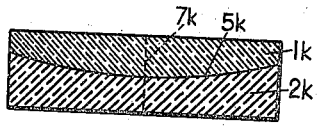
Figure 39 is a sectional view of a laminated unit similar to that of Figure 4.
Figure 40:
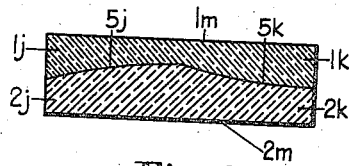
Figure 40 is a sectional view showing a piece of the unit of Figure 38 in edge contact with a piece of the unit of Figure 39.

Figures 38 to 45, inclusive, illustrate how it is possible to obtain still another arrangement of optical centers. A laminated unit like the unit of Figure 33 is provided, as shown in Figure 38. This unit consists of layers 1—j and 2—j fused together along a curved line 5—j. A second laminated unit similar to the unit of Figure 34 is provided, as shown in Figure 39. This unit consists of layers 1—k and 2—k fused together along a curved line 5—k. The unit of Figure 38 is cut along the line 7—j and the unit of Figure 39 is cut along the line 7—k and sections of these two units are combined in the manner indicated in Figures 40 and 41. It will be noted that the left-hand section of the unit of Figure 38 is used with the left-hand section of the unit of Figure 39 in the manner indicated in Figure 40. When these sections are fused together the pieces of glass 1—j and 1—k join together to form a single layer 1—m since they are both of the same high-index glass. The pieces of glass 2—j and 2—k join to form a single layer 2—m since they are both of the same low-index glass. As before, the layer 1—m is adapted to form the segment portion of the lens blank, while the layer 2—m will serve as part of the carrier portion of the composite button. The layer 1—m will have an inner surface consisting of a portion of the convex curve 5—j and a portion of the concave curve 5—k.

Figure 41:
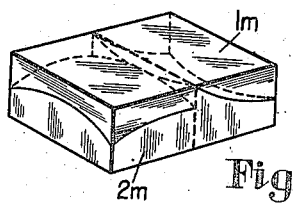
Figure 41 is a perspective view of the unit of Figure 40 after it has been fused.
Figure 42:
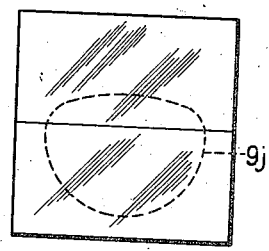
Figure 42 is a plan view illustrating how the segment button may be cut from the unit of Figure 41.
Figure 43:
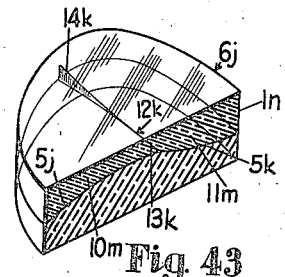
Figure 43 is a view, partly in perspective and partly in section, of the segment button.

The laminated unit of Figure 41 is then cut to the desired shape, for example, along the dotted line 9—j of Figure 42 to form the segment button 6—j shown in Figure 43. It will be noted that this button consists of the layer 1—n of glass of a single index of refraction but will have portions 10—m and 11—m due to the different curves 5—j and 5—k provided on the inner surface thereof. The portion 10—m may serve as the intermediate portion of the final lens while the portion 11—m may serve as the reading portion of the final lens. The differently curved portions 5—j and 5—k are joined to each other along a boundary face 12—k. This face 12—k may lie along a straight line or may lie along an arcuate line. It will be noted from Figure 43 that since the surface 5—j is of convex curvature and the surface 5—k is of concave curvature, the two portions 10—m and 11—m of different powers will not be in the same plane throughout the length of the boundary face. The surfaces 5—j and 5—k may be at the same level at their juncture adjacent the midpoint of the boundary face, as indicated by numeral 13—k in Figure 43 or at other predetermined points, but will be at different levels throughout the remainder of the boundary face 12—k. Thus, there will be a shoulder 14—k formed between the adjacent surfaces 5—j and 5—k along the boundary face 12—k except at its midpoint.

Figure 44:
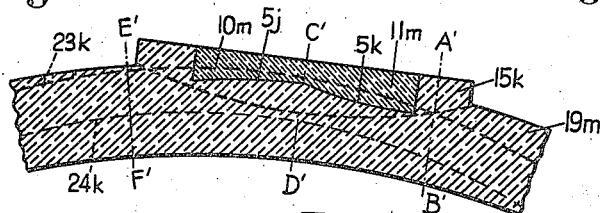
Figure 44 is a sectional view illustrating a composite button, which includes the segment of Figure 43, fused to a main blank.
Figure 45:
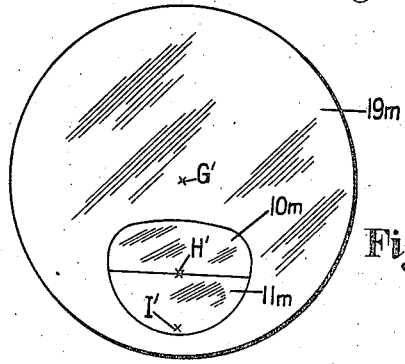
Figure 45 is a plan view of a finished lens blank made from the blank of Figure 44.

The segment 6—j is mounted in carrier portion 15—k, as before, and is fused to a main blank 19—k as shown in Figure 44. The optical center of the portion 11—m will lie along the line A'—B'. The optical center of the portion 10—m will lie along the line C'—D'. The fused blank of Figure 44 may be finished along the lines 23—k and 24—k and the optical center of the portion 19—k will thereby be located along the line E'—F'. The finished blank shown in Figure 45 will thus be formed from the fused blank of Figure 44. It will consist of a distance portion 19—m having its optical center at G', an intermediate vision portion 10—m having its optical center at H', and a reading portion 11—m having its optical center at I'.

In the above description I have specifically disclosed three arrangements of the optical centers. However, it will be understood that innumerable arrangements of the optical centers are possible by varying the cutting of sections from the two original laminated units and associating these sections with each other in various ways. According to my invention, complete control of the optical centers of the reading and intermediate vision portions relative to each other is possible. Furthermore, the location of these optical centers relative to the optical center of the main vision portion may be selectively controlled as desired.

It will be apparent from the above description that I have provided a multifocal ophthalmic lens blank for lenses of more than two fields of vision of such a nature that it will not be necessary to provide a series of major blanks having optical surfaces of varying curvatures formed thereon in order to produce a series of lens blanks having segments of varying powers. The composite button produced according to my invention may be tested for strength and quality before being fused to the major blank, resulting in considerable saving if it must be discarded because of defects.

With my lens blank, it is possible to provide a lens having more than two fields of vision with optical powers in the various fields that may be regulated at will. The optical centers of the minor field in the lens may be selectively located relative to the optical center of the major field and the optical centers of the minor field may be selectively located relative to each other in a more effective manner than heretofore. The dividing lines between the various fields of vision may be of any selected outline.

Various other advantages will be apparent from the preceding description, the drawings and the following claims.

Having thus described my invention, what I claim is:

1. A multifocal ophthalmic lens blank comprising a major blank of a suitable index of refraction, a segment of substantial thickness throughout its entire area embedded in one face of said major blank so as to provide a thick embedded shoulder therearound, said segment being of a single index of refraction which is different from that of the major blank and being embedded in said major blank in such a manner that the segment is substantially laterally surrounded by the major blank so as to provide a thick embedded shoulder around the segment, said segment having a finished optical surface on its inner surface which consists of areas of different contours, said areas being associated with each other along a boundary face in such a manner that the areas will be at the same level at at least one portion of the boundary face therebetween and at different levels along other portions of the boundary face so as to provide merging surfaces along at least a portion of the boundary between the areas and a shoulder along the remainder of said boundary.

2. A multifocal ophthalmic lens blank comprising a major blank of a suitable index of refraction, a segment of substantial thickness throughout its entire area embedded in one face of said major blank so as to provide a thick embedded shoulder therearound, said segment being of a single index of refraction which is different from that of the major blank and being embedded in said major blank in such a manner that the segment is substantially laterally surrounded by the major blank so as to provide a thick embedded shoulder around the segment, said segment having a finished optical surface on its inner surface which consists of areas of concave and convex contours, said areas being associated with each other along a boundary face in such a manner that the areas will be at the same level at at least one portion of the boundary face therebetween and at different levels along other portions of the boundary face so as to provide merging surfaces along at least a portion of the boundary between the areas and a shoulder along the remainder of said boundary.

JAMES H. HAMMON.